Patented Feb. 19, 1935

1,991,637

UNITED STATES PATENT OFFICE 1,991,637

APPLICATION OF MUD-LADEN FLUIDS TO OIL OR GAS WELLS

Phillip E. Harth, St. Louis, Mo., assignor to National Pigments & Chemical Company, St. Louis, Mo., a corporation of Missouri No Drawing. Application October 10, 1929, Serial No. 398,818

20 Claims. (Cl. 255—1)

This invention relates to mud-laden fluids and more particularly to their application to oil or gas wells. This application is a continuation of application Serial No. 71,855, filed November 27, 1925, as to common subject matter.

A mud-laden fluid is used in the drilling or boring or for the control of oil or gas wells. In rotary drilling the fluid is introduced through the drill stem to the bit and there issues to rise in the bore-hole, thereby performing the function of a lubricant and also as a conducting fluid to carry off the cuttings. Such a fluid also performs the function of "mudding off", that is walling the bore-hole, as well as holding down pressures by its weight.

In the Stroud Patent No. 1,575,945, March 9, 1926, is described the application of a mud-laden fluid to oil or gas wells, in which the density of the fluid is controlled by the addition of a heavy suspendable substance such as barytes (barium sulphate), ferric oxide ($Fe_2O_3$) or plumbic oxide (PbO), the barytes or iron oxide or lead oxide being used either alone as a suspendable base or in connection with ordinary mud as obtainable at the well, in order to obtain a mud-laden fluid or suspension having the required specific gravity at the desired viscosity.

While it is not difficult to secure a suspension of the finely divided particles or suspendable bases found in the ordinary mud as used in wells before the advent of the subject-matter of the Stroud patent, and even of the pigment bases barytes, etc., referred to and employed as described in the Stroud patent, the problem of keeping them in suspension is more difficult. It is important that the suspendable base be maintained in suspension in an oil well; for if it should precipitate or settle out, then the drilling operations are interfered with and the tools are liable to stick or become "frozen" especially when the drilling operations are interrupted. Such settling interferes with the landing or setting of casing, oftentimes necessitating drilling out of the settled material. Settling also oftentimes prevents the resumption of circulation, as it is impossible to dislodge the settled material by means of the pressure applied to the fluid by the pumps. Furthermore, settling interferes with the continuous flow to all parts of the bore-hole and causes some of the fluid in the column to be of lower specific gravity than in other parts of the column so that it may not perform its function of "mudding off" the bore-hole and holding down pressures. Furthermore, any settled mud, clay, barytes, or other finely divided heavy material is difficult to remove should it be found desirable or necessary to do so. Settling also increases pumping difficulties and the cost of maintenance.

One of the objects of this invention, therefore, is to provide a mud-laden fluid for oil or gas wells which not only has the heretofore described properties and characteristics desired and necessary in order to adapt it for its intended uses, but in which the suspendable base will also be maintained practically indefinitely in a state of suspension.

Another object is to provide a process or method of applying such a mud-laden fluid to the boring or controlling of oil or gas wells.

Further objects will appear from the detail description in which will be described an illustrative practical embodiment of this invention; it will, however, be understood that this invention is susceptible of various other embodiments.

In accordance with an embodiment of this invention, the mud-laden fluid comprises what is herein referred to descriptively as a suspendable base, composed of a suitably finely divided suspendable material; the suspension or suspendable base has combined therewith or added thereto what is believed to be and is hereinafter referred to descriptively as a concentrated colloidal suspending agent, and which is adapted to keep the suspendable base practically indefinitely in suspension in a suitable liquid such as water, when added thereto to form the mud-laden fluid. In accordance with this invention the mud-laden or drilling fluid contains or employs a concentrated colloidal clay such as Bentonite and such a fluid is employed in the process of boring or controlling of oil or gas wells.

The suspendable base or suspended material may be any of the various materials adapted for distribution in the dispersion medium such as water. It may be any of the finely divided materials heretofore referred to, including clay and the various pigment bases, preferably of high specific gravity. A suitable base is barytes, which even in its raw state is very pure, the barium sulphate content running as high as ninety-eight percent. Other suitable and similar bases are ferric oxide ($Fe_2O_3$) or red pigment or plumbic oxide (PbO) or litharge. All of these can be suspended in ordinary drilling mud as found at the wells.

The concentrated colloidal suspending agent may be a suitable one adapted for the particular suspendable base or disperse phase and the dispersion medium. A suspending agent which I have found particularly useful in keeping the suspendable bases referred to above in suspension in water, is a suitable concentrated colloidal clay known as Bentonite. A typical average sample (after dressing of the crude product) of such a concentrated colloidal clay has the following chemical analysis:

| | Per cent |
|---|---|
| Silica, (SiO₂) | 57.98 |
| Ferrous oxide, (FeO) | 0.12 |
| Ferric oxide, (Fe₂O₃) | 3.80 |
| Alumina, (Al₂O₃) | 22.46 |
| Lime, (CaO) | 1.92 |
| Magnesia, (MgO) | 3.24 |
| Soda and potash, (Na₂O, and K₂O) | 1.35 |
| Sulphur trioxide, (SO₃) | 0.75 |
| Loss on ignition, (H₂O, CO₂, Org.) | 7.93 |
| | 99.45 |

| | Per cent | |
|---|---|---|
| Calcium carbonate, (CaCO₃) | 3.14 | Calculated |
| Sodium sulphate, (Na₂SO₄) | 1.34 | |

The physical analysis of such a typical sample is as follows:

| Division | Name | Diameter in millimeters | Per cent |
|---|---|---|---|
| 1 | Medium sand | 1.0 — 0.5 | None |
| 2 | Sand | 0.5 — 0.15 | 0.04 |
| 3 | Fine sand | 0.15 — 0.075 | 0.41 |
| 4 | Very fine sand | 0.075 — 0.033 | 2.02 |
| 5 | Silt | 0.033 — 0.008 | 3.86 |
| 6 | Fine silt | 0.008 — 0.003 | 2.23 |
| 7 | Very fine silt | 0.003 — 0.0015 | 17.62 |
| 8 | Clay, finer than | —.0015— | 73.82 |

As an example of the practice of this invention, if it is desired to obtain a mud-laden fluid in which the suspendable base or disperse phase is barytes and the dispersion medium water, the concentrated colloidal clay and barytes are mixed dry in the proportion of from 2 to 5% of the colloidal clay and 98 to 95% of barytes. By incorporating this mixture in water in the desired proportion a mud-laden fluid will be formed in which the barytes will remain in suspension practically indefinitely.

It is found that by the employment of the concentrated colloidal clay in the manner described, it will act as a suspending agent so as to keep the suspendable base practically indefinitely in suspension in water or in the mud as found at oil wells. It can be made of the required specific gravity to give the desired weight, and still be found sufficiently thick or viscous in order to hold the cuttings in suspension, while still being of sufficiently low viscosity so as to enable it to be pumped and so as to enable the cuttings to settle in a settling ditch. Even when barytes is used as a suspendable base, a mud of any desired specific gravity can be obtained having the desired physical state. Not only can a mud be made using simply barytes or one of the iron or lead oxides, but the mud so formed can be cut down with ordinary mud as obtainable at the well, so as to obtain the desired mud-laden fluid of the desired specific gravity and of the desired viscosity.

Moreover some of the advantageous features of this invention may be obtained by using ordinary clay together with the concentrated suspending agent. By, however, employing only a small percentage of the concentrated colloidal clay as a suspending agent when barytes alone is used, the mud will not be stained sufficiently to detract from its white color. Accordingly, a mud-laden fluid containing barytes and a small percentage of the colloidal clay will be white and will, therefore, serve to readily indicate the presence of petroleum.

It will, therefore, be seen that in accordance with the described embodiments of this invention there is produced a mud-laden or drilling fluid containing a concentrated colloidal suspending agent such as the colloidal clay of the character described. The suspendable base of the mud-laden fluid is kept in suspension practically indefinitely by the addition of a small percentage of the concentrated suspending agent such as the concentrated colloidal clay heretofore described, while the density can be controlled by the addition or presence of a heavy suspendable substance. Accordingly in oil wells the mud-laden fluid will remain in the right condition in that the base thereof is kept in suspension, even if the drilling operations are interrupted for an extended length of time. While clay laden drilling fluids contain colloidal material, and while the specific gravity of such clay laden fluids has been substantially increased by the addition of barytes, etc; the proportion or concentration of colloidal material is relatively small, thereby imposing limits on the colloidal material which a drilling fluid may contain before the limiting viscosity is reached. By, however, adding a concentrated colloidal suspending agent as distinguished from a dilute one to the drilling fluid, it is only necessary to add a small percentage of the suspending agent in order to secure the desired results.

The specific concentrated colloidal suspending agent "Bentonite" referred to and described by its chemical and physical characteristics, is particularly useful and valuable in maintaining the mud-laden fluid in a state of suspension at the bottom of a deep well. It also produces a mud-laden fluid having the desired properties and characteristics heretofore described. It is a material which after removal of its sandy impurities, usually contains 75% or more of the crystalline claylike minerals, montmorillonite beidellite, and which is now commonly classified and known as a Bentonite. It has a strong affinity for water, absorbing many times its weight or volume of water with a consequent increase in volume and with the formation of a slippery, plastic, gelatinous mass that resembles soft soap and which when agitated with more water, results in a permanent suspension. Some authorities have classified Bentonite as emulsoid colloids particularly because of this characteristic of water absorption and swelling. Other suitable concentrated colloidal suspending agents and more particularly emulsoid colloids may, however, be employed to attain some or all of the objects and advantageous features of this invention. Examples of these are starch, gelatin, sodium silicate solutions, gum tragacanth, agar, casein glue, soybean glue, albumin, and other similar substances, all of which act as suspending agents upon the bases which may be used in mud-laden fluids.

It is to be understood that while a theory of operation has been advanced, it is not the only or necessary one but has only been advanced to facilitate the disclosure. It is understood, however, that this invention is not limited to any theory of operation or action. It is further obvious that various changes may be made in the details without departing from the spirit of this invention; it is, therefore, to be understood that this invention is not to be limited to the specific details described.

Having thus described the invention, what is claimed is:

1. A mud-laden fluid for oil or gas wells comprising a suspensible base and an added concentrated colloidal suspending agent therefor.

2. A mud-laden fluid for oil or gas wells comprising a suspendable base and a small percentage of an added concentrated colloidal suspending agent therefor.

3. A mud-laden or drilling fluid for oil or gas wells containing a concentrated colloidal clay of the character described.

4. A mud-laden fluid for oil or gas wells comprising 98-95% of a suspendable base and 2%-5% of a concentrated colloidal clay.

5. A mud-laden fluid for oil or gas wells comprising a suspendable base having a specific gravity substantially in excess of that of clay and an added concentrated colloidal suspending agent for said base.

6. A mud-laden fluid for oil or gas wells comprising a pigment base suspensoid and an added concentrated colloidal suspending agent therefor.

7. A mud-laden fluid for oil or gas wells comprising barytes and an added concentrated colloidal suspending agent therefor.

8. A mud-laden fluid for oil or gas wells comprising barytes and a concentrated colloidal clay.

9. A mud-laden fluid for oil or gas wells comprising barytes and 2%-5% of a concentrated colloidal clay.

10. A mud-laden or drilling fluid for oil or gas wells containing Bentonite.

11. A mud-laden fluid for oil or gas wells comprising a suspendable base and a small percentage of Bentonite.

12. A mud-laden fluid for oil or gas wells containing barytes and Bentonite.

13. In the art of boring or controlling oil or gas wells, the process comprising introducing into the well a mud-laden fluid containing a suspendable base and adding thereto a concentrated colloidal suspending agent therefor.

14. In the art of boring or controlling oil or gas wells, the process comprising introducing into the well a mud-laden fluid containing a suspendable base and keeping the base in suspension by the addition of a concentrated colloidal suspending agent therefor.

15. In the art of boring or controlling oil or gas wells, the process comprising introducing into the well a mud-laden fluid, controlling the density thereof by the addition of a heavy suspendable base and keeping the heavy base in suspension by the addition of a concentrated colloidal suspending agent therefor.

16. In the art of boring or controlling oil or gas wells, the process comprising introducing into the well a mud-laden or drilling fluid containing a concentrated colloidal clay of the character described.

17. In the art of boring or controlling oil or gas wells, the process comprising introducing into the well a mud-laden fluid, controlling the density thereof by the addition of barytes and keeping the barytes in suspension by the addition of a concentrated colloidal clay.

18. In the art of boring or controlling oil or gas wells, the process comprising introducing into the well a mud-laden fluid and a concentrated colloidal suspending agent adapted to keep the particles of the mud-laden fluid in suspension.

19. In the art of boring or controlling oil or gas wells, the process comprising introducing into the well a mud-laden or drilling fluid containing Bentonite.

20. In the art of boring or controlling oil or gas wells, the process comprising introducing into the well a mud-laden fluid the base of which is composed of barytes and Bentonite.

PHILLIP E. HARTH.

DISCLAIMER 1,991,637.—*Phillip E. Harth*, St. Louis, Mo. APPLICATION OF MUD-LADEN FLUIDS TO OIL OR GAS WELLS. Patent dated Feb. 19, 1935. Disclaimer filed Nov. 26, 1946, by the inventor and the assignee, *National Lead Company.*

Hereby disclaim:

From the specification viz., page 1, second column, lines 47 and 48, and from the scope of each and every one of the claims thereof, "red pigment or plumbic oxide (PbO) or litharge";

From the specification viz., page 2, second column, lines 62 and 63, and from the scope of each and every one of the claims thereof, "sodium silicate solutions";

From the scope of each and every one of claims 1, 2, 5, 6, 7, 13, 14, 15, and 18, all concentrated colloidal suspending agents, except such as were properly described as "emulsoid colloids," viz., those having the characteristics of water absorption and swelling with a consequent increase in volume, and which "emulsoid colloids" are of a class consisting of bentonite, starch, gelatin, gum tragacanth, agar, casein glue, soybean glue and albumin;

From the scope of each and every one of claims 3, 4, 8, 9, 16, and 17, all concentrated colloidal clays except such concentrated colloidal clays a typical average sample of which has the following analyses:

|  | Percent |
|---|---|
| Silica, $(SiO_2)$ | 57.98 |
| Ferrous oxide, $(FeO)$ | 0.12 |
| Ferric oxide, $(Fe_2O_3)$ | 3.80 |
| Alumina, $(Al_2O_3)$ | 22.46 |
| Lime, $(CaO)$ | 1.92 |
| Magnesia, $(MgO)$ | 3.24 |
| Soda and potash, $(Na_2O, and K_2O)$ | 1.35 |
| Sulphur trioxide, $(SO_3)$ | 0.75 |
| Loss on ignition, $(H_2O, CO_2, Org.)$ | 7.93 |
|  | 99.45 |
| Calcium carbonate, $(CaCO_3)$, calculated | 3.14 |
| Sodium sulphate, $(Na_2SO_4)$, calculated | 1.34 |

| Division | Name | Diameter in millimeters | | Percent |
|---|---|---|---|---|
| 1 | Medium sand | 1.0 | −0.5 | None |
| 2 | Sand | 0.5 | −0.15 | 0.04 |
| 3 | Fine sand | 0.15 | −0.075 | 0.41 |
| 4 | Very fine sand | 0.075 | −0.033 | 2.02 |
| 5 | Silt | 0.033 | −0.008 | 3.86 |
| 6 | Fine silt | 0.008 | −0.003 | 2.23 |
| 7 | Very fine silt | 0.003 | −0.0015 | 17.62 |
| 8 | Clay, finer than | −.0015− |  | 73.82 | and which concentrated colloidal clays have the physical properties and characteristics as described, viz., of keeping the described suspendable bases of mud-laden !fluids for the drilling of oil or gas wells in suspension practically indefinitely and of walling the bore hole; and From the scope of each and every one of claims 10, 11, 12, 19, and 20 all bentonites except such as were properly described as "emulsoid colloids," viz., those having the characteristics of water absorption and swelling with a consequent increase in volume.

[*Official Gazette December 24, 1946.*]

Disclaimer 1,991,637.—*Phillip E. Harth*, St. Louis, Mo. APPLICATION OF MUD-LADEN FLUIDS TO OIL OR GAS WELLS. Patent dated Feb. 19, 1935. Disclaimer filed Apr. 7, 1948, by the inventor, and the assignee, *National Lead Company*.

Hereby enter this disclaimer to the following parts of the specification and claims—

From the specification all mud-laden or drilling fluids except such as are primarily composed of ordinary water-clay muds, but containing also an added concentrated colloidal suspending agent or an added concentrated colloidal clay or a bentonite, all as hereinafter additionally defined;

From the specification all concentrated colloidal suspending agents except a concentrated colloidal clay or a bentonite both as hereinafter additionally defined, starch, gum tragacanth, and agar;

From the specification all concentrated colloidal clays and all bentonites except such which, after the dressing of the crude product, that is, after removal of its sandy impurities, contains predominantly montmorillonite which imparts the characteristics of strong affinity for water, absorbing many times its weight or volume of water with a consequent increase in volume and with the formation of a slippery, plastic, gelatinous mass that resembles soft soap and which when agitated with more water, results in a permanent suspension;

From the specification the following appearing on page 2, right-hand column, lines 62 to 64 inclusive: "gelatin", "sodium silicate solutions", "casein glue", "soybean glue", and "albumin";

From the scope of each and every claim all mud-laden or drilling fluids except such as are primarily composed of ordinary water-clay muds, but containing also an added concentrated colloidal suspending agent, or an added concentrated colloidal clay or a bentonite, as designated in the respective claims, all as heretofore additionally defined;

From the scope of each and every one of claims 1, 2, 5, 6, 7, 13, 14, 15, and 18, all concentrated colloidal suspending agents except a concentrated colloidal clay or a bentonite both as heretofore additionally defined, starch, gum tragacanth and agar;

From the scope of each and every one of claims 4, 5, 6, and 15, each and every designated "suspendable base" and "pigment base" except barytes or iron oxide;

From the scope of each and all of claims 3, 4, 8, 9, 16, and 17, all concentrated colloidal clays except such which, after the dressing of the crude product, that is, after removal of its sandy impurities, contains predominantly montmorillonite which imparts the characteristics of strong affinity for water, absorbing many times its weight or volume of water with a consequent increase in volume and with the formation of a slippery, plastic, gelatinous mass that resembles soft soap and which when agitated with more water, results in a permanent suspension;

From the scope of each and every one of claims 10, 11, 12, 19, and 20, all bentonites, except such which, after the dressing of the crude product, that is, after removal of its sandy impurities, contains predominantly montmorillonite which imparts the characteristics of strong affinity for water, absorbing many times its weight or volume of water with a consequent increase in volume and with the formation of a slippery, plastic, gelatinous mass that resembles soft soap and which when agitated with more water, results in a permanent suspension.

[*Official Gazette May 11, 1948.*]